(12) United States Patent
Campbell et al.

(10) Patent No.: US 9,066,634 B2
(45) Date of Patent: *Jun. 30, 2015

(54) AIR JET FITTINGS FOR BATHING INSTALLATIONS

(75) Inventors: Graham J. Campbell, Stevenson Ranch, CA (US); Eric J. Kownacki, Rancho Bernardo, CA (US)

(73) Assignee: Balboa Water Group, Inc., Tustin, CA (US)

(*) Notice: Subject to any disclaimer, the term of this patent is extended or adjusted under 35 U.S.C. 154(b) by 297 days.

This patent is subject to a terminal disclaimer.

(21) Appl. No.: 13/564,657

(22) Filed: Aug. 1, 2012

(65) Prior Publication Data

US 2014/0033420 A1 Feb. 6, 2014

(51) Int. Cl.
| | |
|---|---|
| A61H 33/06 | (2006.01) |
| A61H 33/04 | (2006.01) |
| A47K 3/10 | (2006.01) |
| A61H 33/00 | (2006.01) |
| A61H 33/02 | (2006.01) |
| E03C 1/048 | (2006.01) |
| B23B 51/10 | (2006.01) |

(52) U.S. Cl.
CPC .............. *A47K 3/10* (2013.01); *A61H 33/6063* (2013.01); *A61H 33/026* (2013.01); *A61H 33/6005* (2013.01); *A61H 2033/023* (2013.01); *E03C 1/048* (2013.01); *B23B 51/107* (2013.01)

(58) Field of Classification Search
CPC ......... A47K 3/10; A61H 33/00; A61H 33/02; A61H 33/0087
USPC ..................................... 4/541.5, 541.1–541.6
See application file for complete search history.

(56) References Cited

U.S. PATENT DOCUMENTS

| | | | |
|---|---|---|---|
| 3,251,071 | A | 5/1966 | Wood |
| 3,467,969 | A | 9/1969 | Szekely |
| 3,580,275 | A | 5/1971 | Hanson |
| 4,387,854 | A | 6/1983 | Dupont |
| 4,672,692 | A | 6/1987 | Savage |
| 4,805,664 | A | 2/1989 | Mattei |
| 4,901,379 | A | 2/1990 | Chalberg |
| 5,381,563 | A | 1/1995 | Isabelle |
| 5,546,617 | A | 8/1996 | Sandrin |
| 5,930,851 | A | 8/1999 | Brunelle |
| 6,427,257 | B1 | 8/2002 | Castellote |
| 7,454,802 | B2 | 11/2008 | Tennant |
| 7,614,095 | B2 | 11/2009 | Swart |
| 7,665,158 | B2 | 2/2010 | Castellote |
| 8,182,212 | B2 | 5/2012 | Parcell |
| 2004/0083544 | A1* | 5/2004 | Castellote ...................... 4/541.4 |
| 2006/0236448 | A1* | 10/2006 | Ciechanowski et al. ....... 4/541.6 |
| 2007/0067900 | A1* | 3/2007 | Moretto ......................... 4/541.6 |
| 2008/0276363 | A1* | 11/2008 | Chen .............................. 4/541.6 |

\* cited by examiner

*Primary Examiner* — Huyen Le
*Assistant Examiner* — Christine Skubinna
(74) *Attorney, Agent, or Firm* — Larry K. Roberts (57) ABSTRACT

An air jet includes a body portion defining a hollow main body portion having an interior opening, and a connection portion having an air passageway in communication with the interior opening. The connection portion includes at least one connection port for attachment to a hose carrying pressurized air, and a flange portion defining a recessed mount surface inside a peripheral lip surrounding a recess, with a plurality of open regions defined in the peripheral lip. A nozzle member is fitted into the interior opening and has a nozzle orifice and nozzle tip protruding into the recess, the nozzle opening configured to allow pressurized air to pass from the connection port through the central opening and through the nozzle orifice into the tub hole and the tub.

17 Claims, 12 Drawing Sheets

AIR JET FITTINGS FOR BATHING INSTALLATIONS

BACKGROUND

Bathing installations such as bath tubs, whirlpool baths, and spas may utilize air jets to deliver pressurized air into the bathing water in a bathing installation vessel. The installation of air jets to a vessel presents difficulties in attachment to the vessel, and connection of the air jets to a source of pressurized air.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

In the following detailed description and in the several figures of the drawing, like elements are identified with like reference numerals.

Exemplary embodiments of air jets for bathing installations are described. The air jets may serve as air massage jets for the bathing installation. In an exemplary embodiment, the air jet mounts to the outside surface of the bath shell or tub. The exemplary embodiments may include one or more of the following features:

(1) The air jet provides a stealth or minimalistic look to the inside of the bathing installation tub.

2) Air exits the air jet into the bath by a small hole drilled through the shell of the bath concentric with an air exit orifice in the jet.

3) The air jet is configured to mount to the vertical sides of the bath tub or beneath the floor of the tub.

4) The air jet can be used with or without an internal check valve or one way flow valve.

5) The air jet connection for attachment to an air hose may be smooth, barbed or socket-type connections, for example. For a smooth and a barbed connection, the hose end is slid over the outer surface of the air jet connecting port. For a socket-type connection, a socket connection is fitted inside the air jet connecting portion.

6) The connection(s) for air hose(s) may be in an "L" or "T" shape.

7) The connection for the air hose ("L" or "T") may also be angled or compound angled thus appearing in a "V" type or broken wing appearance, and may provide one or more of the following features:

a. The angle or compound angle when mounted to the side of the bath and pointed upward creates a self-draining effect through each individual jet (no check valve required). This permits jets to be placed at different elevations and still drain. Conventional jets instead need to be in a straight line daisy chain for jets to drain.

b. The angle, besides promoting drainage, makes installation of the tubing between jets easier when placed close together. Convention jets with straight 180 degree connection have very little space between them to try to install the tubing.

c. The compound angle also moves the ends of the tube connections and tubing farther away from the tub shell creating more clearance for fingers to promote ease of tubing installation.

8) The air jet may be provided to the customer as a single piece construction, without requiring threaded multi-piece end flanges or threaded bodies to assemble with annular seals.

9) Slots may be provided around a recessed mounting lip to allow excess adhesive or glue to exit and not block the hole for airflow in the tip of the body.

10) Air exits through a protruding nozzle tip on the mounting surface of the air jet that is at the same height or plane with the outer lip of the mounting surface, in one exemplary embodiment. This keeps adhesive or glue from entering the air exit orifice.

11) A protruding nozzle tip may be provided around the air exit orifice which protrudes past the plane described by the outer lip of the mounting surface, in another embodiment. This protruding nozzle tip can extend into a recess or chamfer around the tub shell hole in the back side of the tub shell for ease of installation and to keep adhesive or glue from entering the air exit orifice.

12) The air jet may be installed in the following set of steps:

a. Drill a small diameter hole through the tub shell.

b. Adhesive or glue is applied in the area between the protruding nozzle tip and the slotted perimeter mounting lip and when pushed against the tub shell the excess adhesive or glue exits the slots in the perimeter lip of the mounting flange.

c. The alignment of the air jet nozzle orifice in the jet and the hole in the tub shell can be facilitated by several techniques, such as a pin guide placed through the hole in the tub shell, or magnets aligning the air jet with a fixture on the inside of the tub shell. Another alternative is to extend the air jet nozzle tip to protrude beyond the plane described by the outer lip of the mounting surface. This protruding nozzle can fit into a recess or hole chamfer drilled on the backside of the tub shell to easily locate the hole in the tub shell with the air exit orifice.

13) The air jet can be installed on a bath as an air massage system only or in conjunction with a hydrotherapy system utilizing water jets.

14) An air massage system includes a source for positive air pressure that is sent through a plumbing system and hose to arrive at the air jet hose connection and passes thought the air jet exiting through the orifice and then through the hole in the tub shell into the bath. If an internal check valve is in the air jet, the air pressure must be sufficient open the check valve to have the air exit the orifice and through the wall in the side of the tub.

15) The internal air check valve prevents water from back flowing into the air jet and plumbing keeping the plumbing system "dry". This permits the air to flow into the bath more quickly when the system is initiated since there is no water to evacuate from the plumbing. The check valve also keeps water from remaining in the lines, preventing any retained water.

Figure 1A:
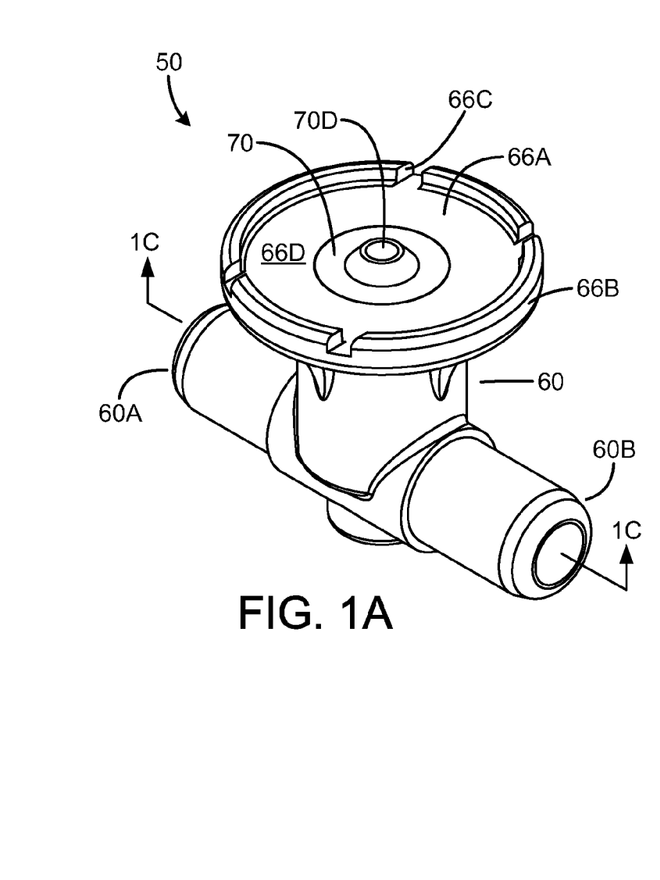
FIG. 1A is an isometric view of an exemplary embodiment of an air fitting for a bathing installation.
Figure 1B:
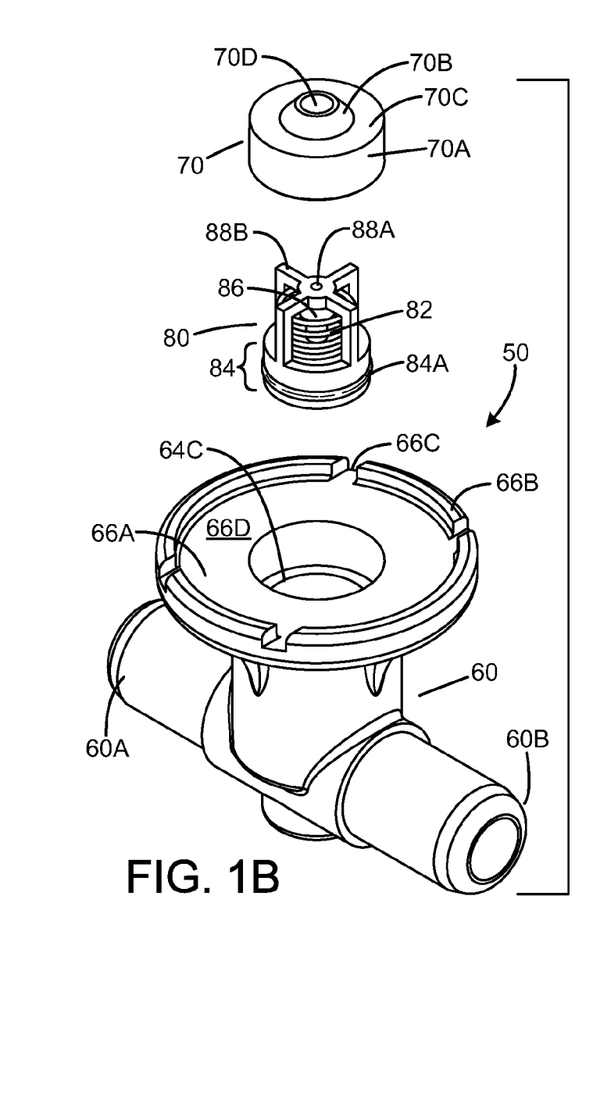
FIG. 1B is an exploded isometric view of the air fitting of FIG. 1A.
Figure 1C:
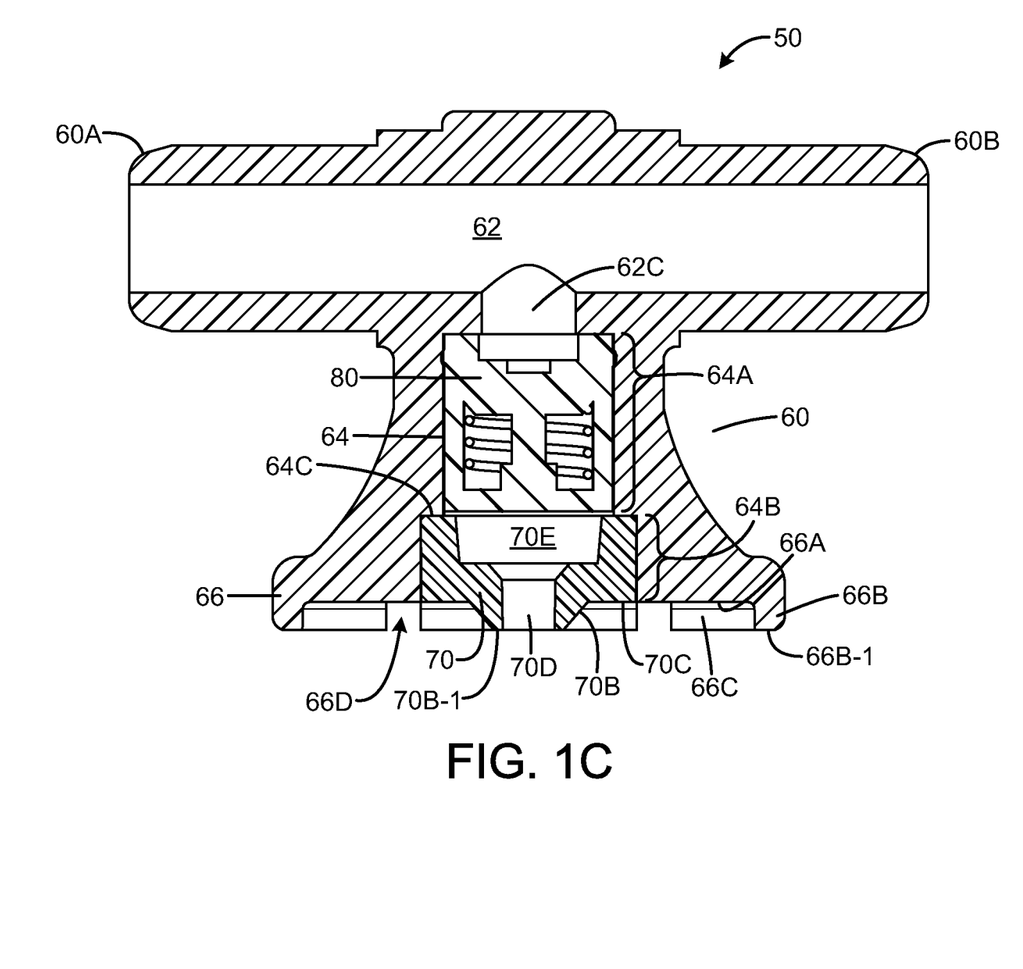
FIG. 1C is a cross-section view of the air fitting of FIG. 1A, taken along line 1C-1C.

The figures illustrate several embodiments of an air jet incorporating one or more of the features described above. FIGS. 1A-1C illustrate a first embodiment of an air jet 50. The air jet includes a jet body structure 60, a jet nozzle structure 70 and a one way flow valve 80. For some applications, the one way flow valve may be omitted. In this exemplary embodiment, the air jet provides a straight T configuration, with air connection portions 60A and 60B connected to an air passageway 62. Air hoses may be connected to the respective air connection portions. The passageway 62 is in fluid communication with an air jet body opening or cavity 64 through an opening 62C formed in the jet body 60. In an exemplary embodiment, the air passageway 62 has a diameter of ¼ inch, and the connection portions are configured to attach to air hoses having a nominal inner diameter of ⅜ inch.

The body opening 64 in this exemplary embodiment is generally cylindrical with a stepped change in diameter from a first diameter of opening portion 64A to a second, larger diameter of opening portion 64B, to define a shoulder 64C. The valve 80 has an outer diameter sized to fit into the first opening portion 64A, and in this embodiment includes a first valve body portion 84 with an exterior peripheral elastomeric O-ring 84A to provide an interference, sealing fit of the valve into the air jet body. The nozzle 70 and the tub shell wall also serve to maintain the valve 80 in position after installation of the air jet to the tub wall.

The air jet nozzle 70 is fitted into the opening portion 64B of the body 60, and is seated against the shoulder 64C. The nozzle 70 is press fit into engagement with the jet body in an exemplary embodiment. In an exemplary embodiment the nozzle includes a substantially cylindrical portion 70A, with a protruding tapered nozzle tip 70B extending from the surface 70C of the portion 70A. In an exemplary embodiment, the nozzle includes a through opening or orifice 70D passing through the nozzle body, into a nozzle recess opening 70E formed in the interior side of the nozzle 70 when installed in the jet body, to communicate with the body opening 64 of the jet body structure 60 via the one-way flow valve 80. In this exemplary embodiment, the face surface 70B-1 of the nozzle tip 70B is about flush with the edge 66B-1 of the lip portion 66B. In other embodiments, the face surface extends beyond the edge of the lip portion and may serve as a pilot to align to the opening formed through a tub wall, as describe below in further detail.

In an exemplary embodiment, the flow valve 80 is a check valve including a poppet spring 82 which applies a bias force tending to hold a poppet or plunger 86 in a closed position against an inwardly projecting peripheral lip portion or valve seat of the check valve body. When sufficient air pressure is applied to the airjet, the spring 82 is compressed, the air pressure pushing the poppet 86 away from the peripheral lip portion and opening an air channel between the air passageway 62C and the nozzle 70. A stem portion of the poppet 86 is displaced through the opening 88A formed in the web portion 88B of the valve cage portion 88. With air pressure diminished below a valve break pressure, the spring pushes the poppet back into sealing engagement with the peripheral lip portion. One way flow valves suitable for the purpose are commercially available.

The air jet body 60 includes a flange portion 66, defining a recessed mount surface 66A defined inside a peripheral lip 66B at a mounting surface side of the jet body 60, and forming a shallow recess 66C. Slots 66D are defined in the peripheral lip 66B, and allow excess adhesive applied to the mount surface 66A within the recess 66C to escape during installation. Typically the adhesive is a liquid or gel such as an epoxy when applied and then cures to a hardened state.

The air jet body 60 and nozzle 70 may each be fabricated as injection molded parts, from a plastic material, e.g. PVC or ABS. In an exemplary embodiment, the air jet 50 is delivered to a customer/user as an assembled device, i.e. with the nozzle and one-way valve assembled to the jet body, facilitating installation by reducing or eliminating the need to assemble the air jet before installation.

Figure 2:
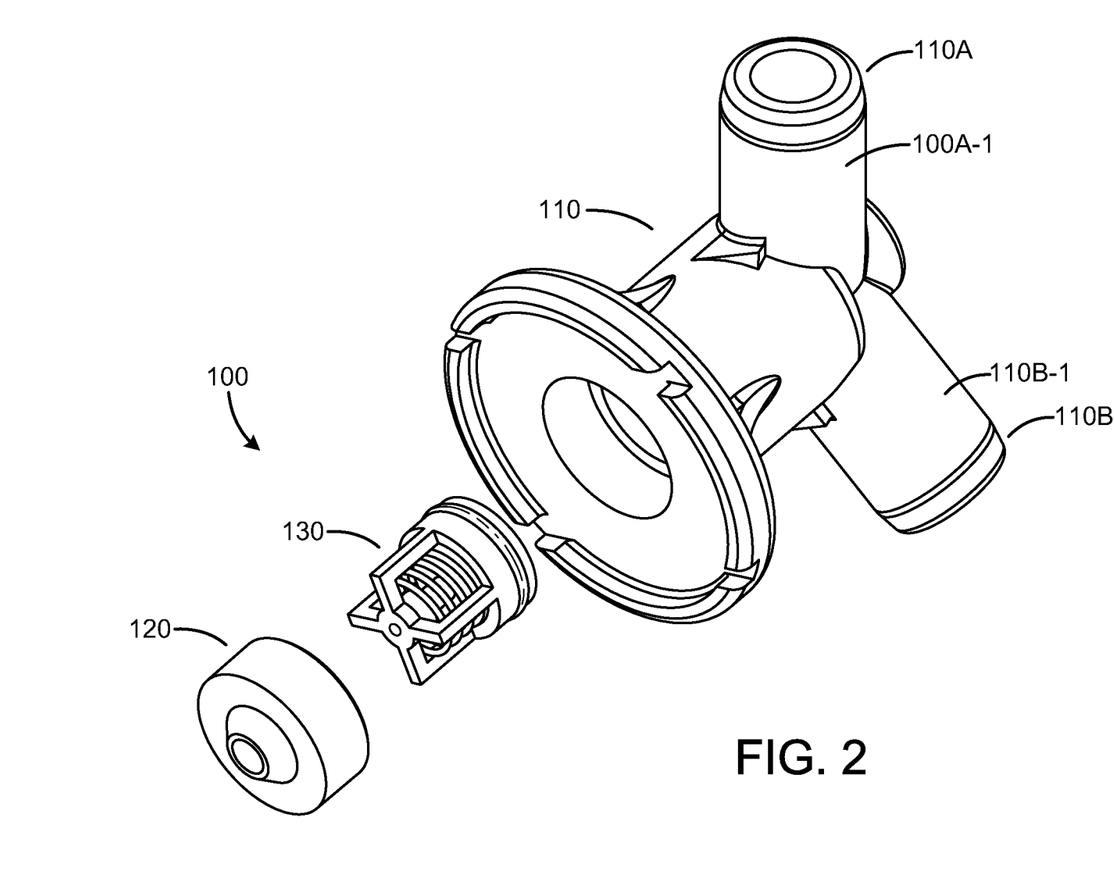
FIG. 2 is an exploded isometric view of another embodiment of an air fitting for a bathing installation.
Figure 3A:
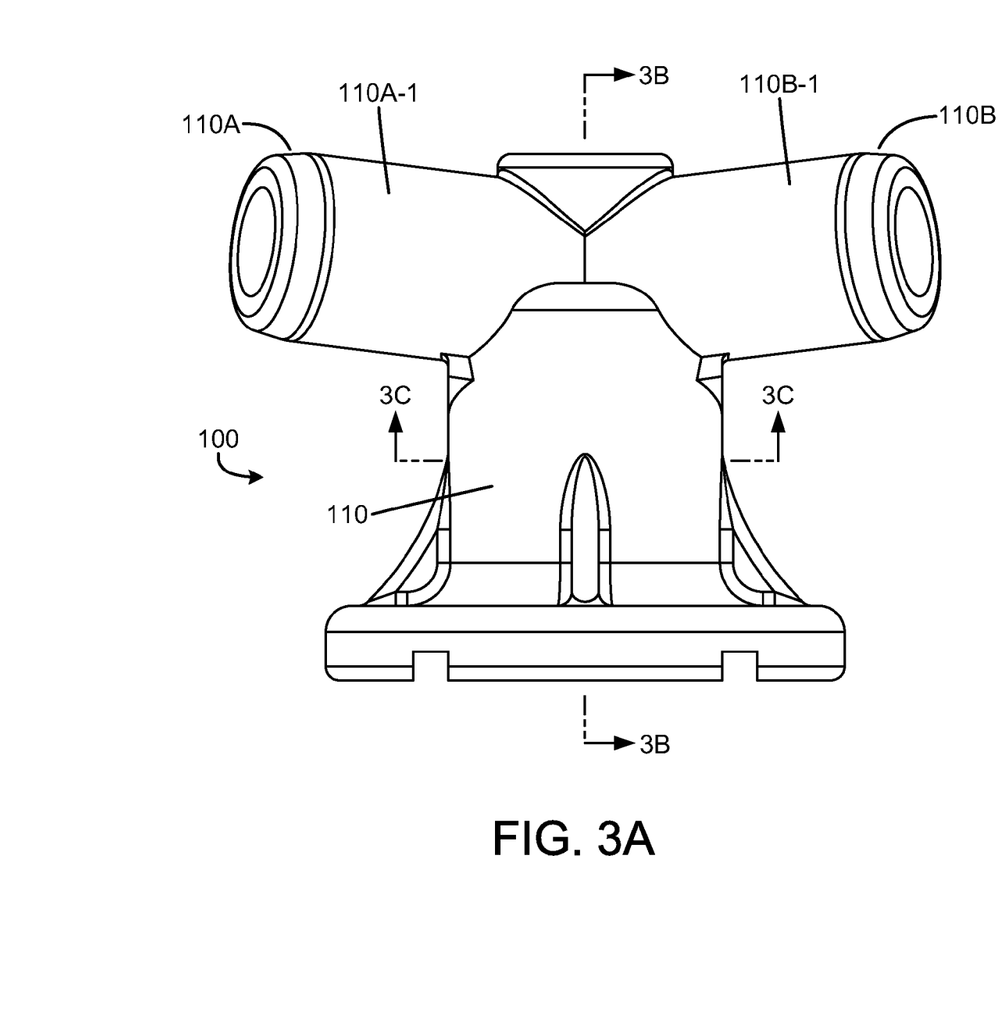
FIG. 3A is a front plan view of the air fitting of FIG. 2.
Figure 3B:
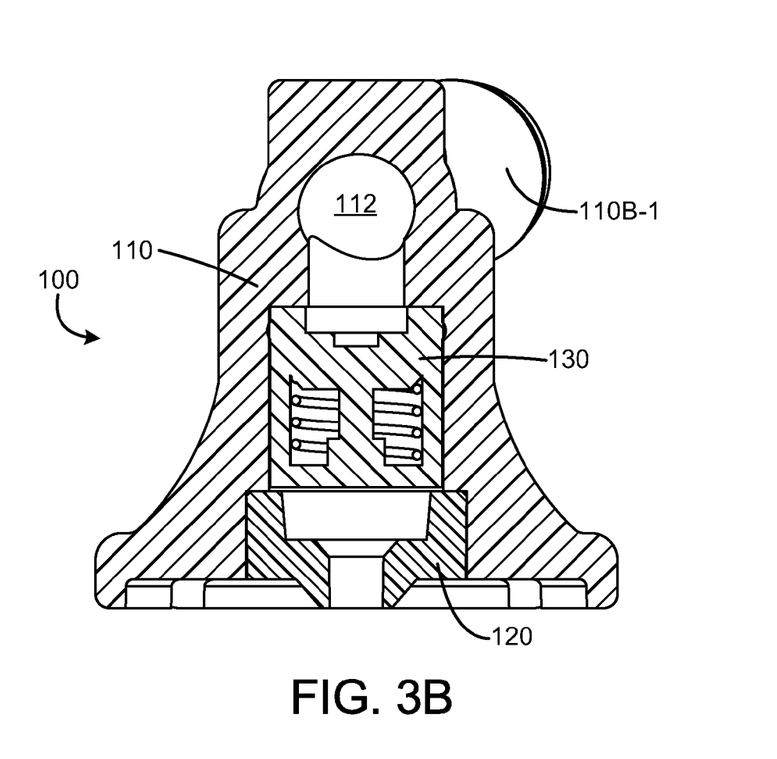
FIG. 3B is a cross-sectional view of the air fitting as shown in FIG. 3A, taken along line 3B-3B.
Figure 3C:
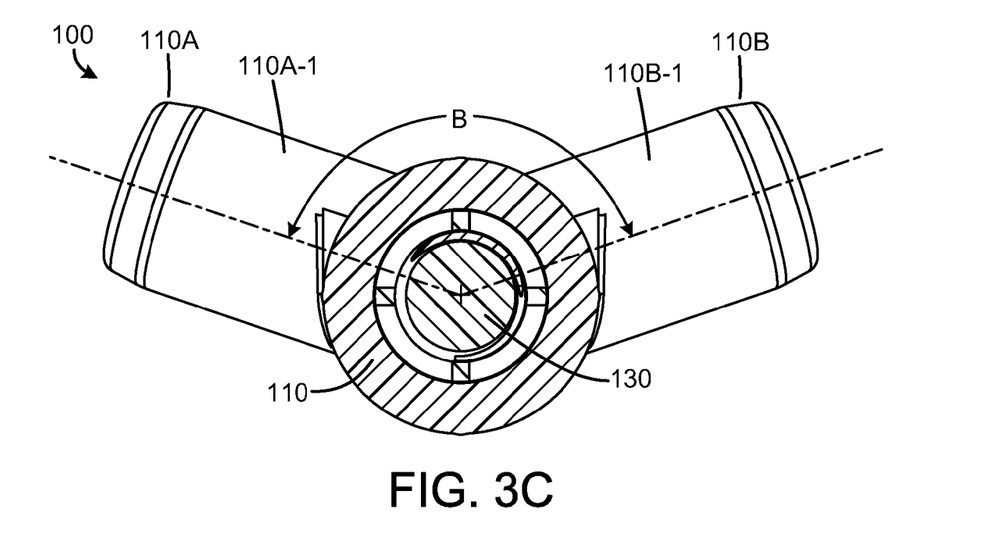
FIG. 3C is a cross-sectional view of the air fitting as shown in FIG. 3A, taken along line 3C-3C.
Figure 4A:
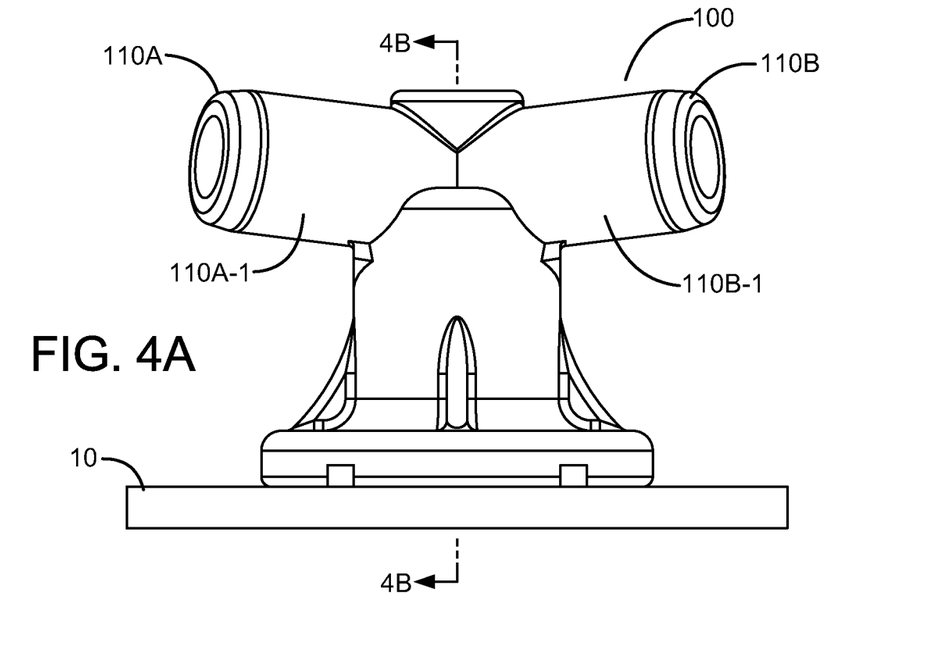
FIG. 4A is a front plan view of the air fitting of FIG. 3, positioned on a representation of a tub wall of a bathing installation.
Figure 4B:
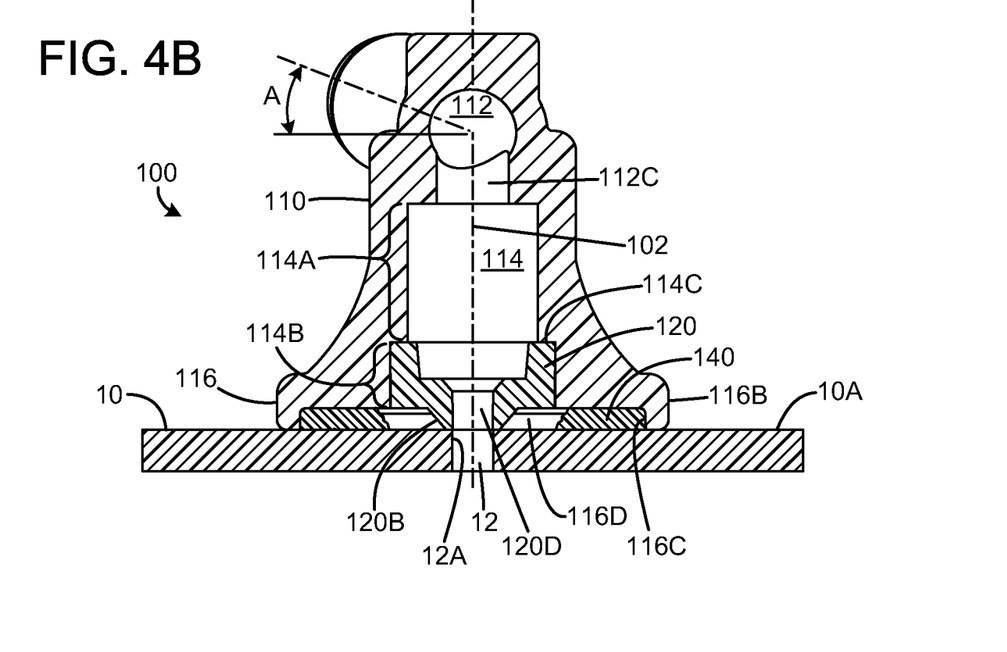
FIG. 4B is a cross-sectional view of the air fitting and tub wall as shown in FIG. 4A, taken along line 4B-4B.

FIGS. 2-4B illustrate another embodiment of an air jet 100. The jet 100 is similar to jet 50 described above regarding FIGS. 1A-1C, except that, instead of a straight T body, the body 110 has tube connections 110A-1 and 110B-1 which each define a compound angle relative to the center axis 102 of the air jet. As noted above, the angle or compound angle when mounted to the side of the bath tub and pointed upward creates a self-draining effect though each individual jet; when so mounted, a check valve is not required. This permits jets to be placed at different elevations and still drain. Thus, the exemplary embodiment 100 may not include a check valve. FIGS. 2, 3B and 3C illustrate the jet 100 with a check valve 130; FIG. 4B shows the jet 100 without a check valve. The nozzle 120 is seated against the shoulder 114C defined by the abrupt change in diameter of the body opening 114 between body opening region 114A and 114B. The body opening 114 communicates with air passageway 112 through opening 112C.

In this exemplary embodiment, each tube connection projects from the perpendicular to the jet center axis 102 by angle A (FIG. 4B), and the tube connections subtend an angle B from the center axis 102 when viewed from the top or bottom of the jet 100 (FIG. 3C). This facilitates ease of installation by moving the ends of the tube connections further away from the tub wall during installation. For one exemplary embodiment, angle A is about 20 degrees, and angle B is about 140 degrees; other values may be selected according to the requirements of a particular application.

FIG. 4B illustrates an exemplary installation of the air jet 100 on a tub wall portion illustrated as element 10. Typically the tub wall is fabricated of fiberglass, although the air jet may be installed to tubs fabricated of other materials as well. A hole 12 is formed in the tub wall, typically by drilling. The air jet 100 may be secured to the surface 10A of the tub wall by a liquid adhesive 140, such as an epoxy, placed in the shallow recess 116C of the flange portion 116. The slots 116D formed in the peripheral lip 116B allow excess adhesive to escape, and the jet is secured in place once the adhesive has cured.

Figure 5A:
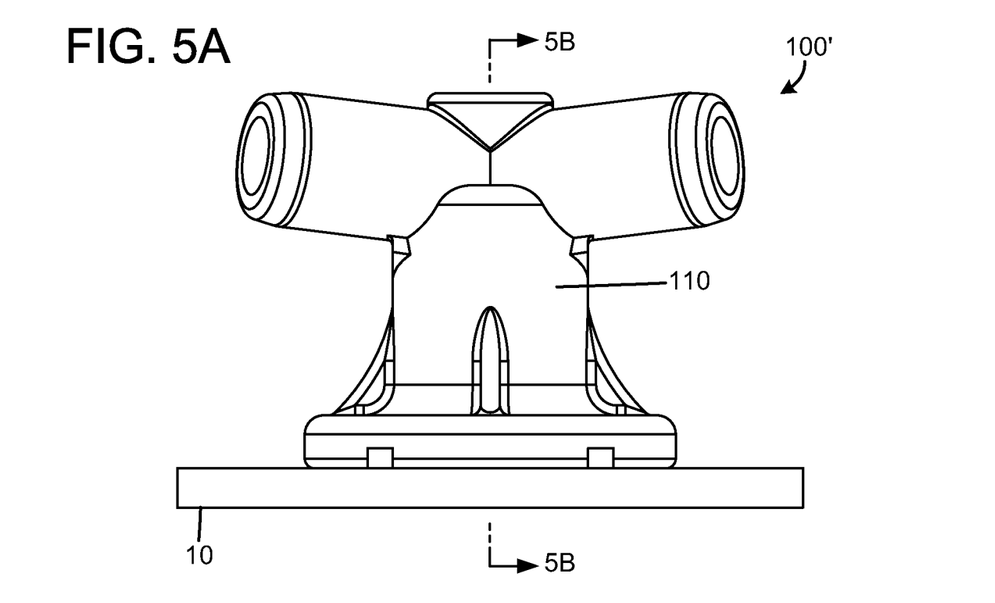
FIG. 5A is a front plan view of another alternative embodiment of an air fitting for a bathing installation, positioned on a representation of a tub wall of the bathing installation.
Figure 5B:
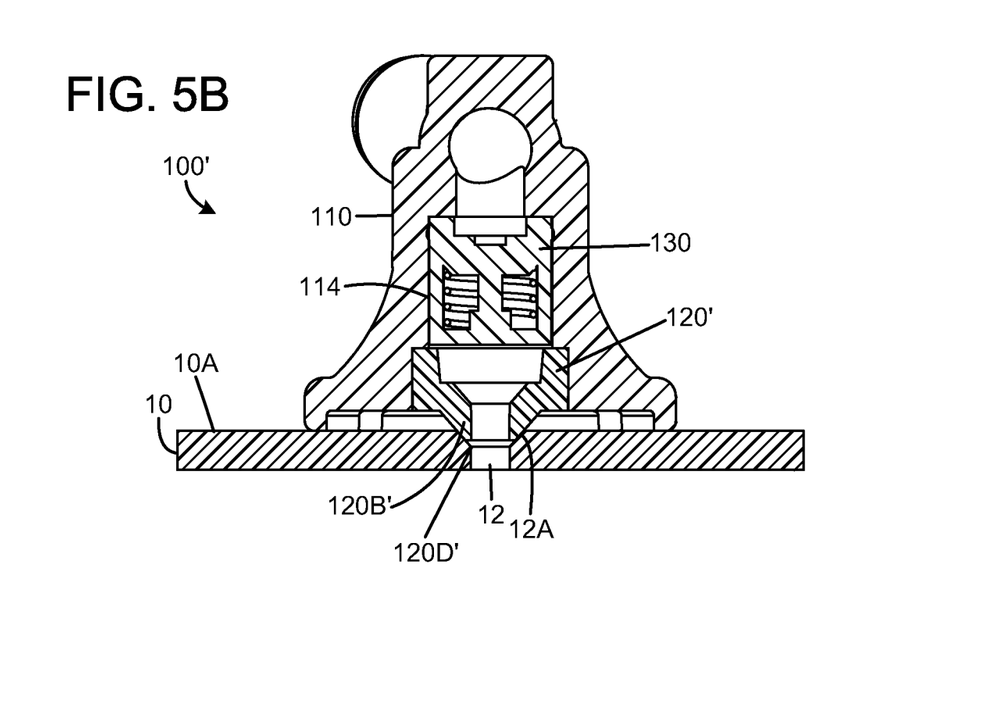
FIG. 5B is a cross-sectional view of the air fitting and tub wall of FIG. 5A, taken along line 5B-5B.
Figure 5C:
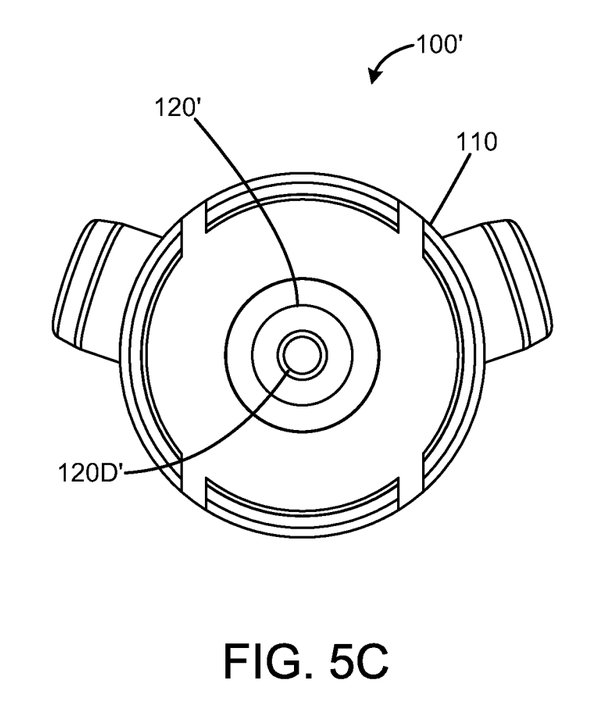
FIG. 5C is a bottom view of the air fitting of FIGS. 5A and 5B.

The center axis 102 of the jet body is aligned with the hole 12 formed in the tub wall. A guide pin pushed through the hole 12 in the tub may be used to align the nozzle orifice 120D of the nozzle with the hole 12. The nozzle tip 120B face surface contacts the tub shell surface surrounding the hole 12 to prevent liquid adhesive from flowing into the shell hole 12; a guide pin when used during installation also prevents adhesive flow into the hole 12. In an exemplary embodiment, the tub wall may be fiberglass, with a thickness of ⅛ (0.125) inch, and the hole 12 drilled or formed in the wall has a diameter of 0.125 inch. The nozzle orifice 120D may in this example also have a diameter of 0.125 inch. In this embodiment, the diameter of the front flange portion is 1.16 inches, and the length of the body portion, i.e. the distance the body portion protrudes from the wall when attached to the wall, is 1.125 inches. Thus, for this exemplary embodiment, the flange diameter and the body portion length are both less than about 1.25 inches FIGS. 5A-5C show another embodiment of an air jet 100' which is similar to air jet 100 of FIGS. 2-4B, and includes a check valve 130, positioned within the body opening 114, and the nozzle 120' includes a somewhat longer nozzle tip portion 120B' such that the nozzle tip surface 120D' is positioned into the beveled portion 12A of the hole 12 formed in the tub wall 10. This embodiment provides a self-aligning feature, since the installer guides the jet into position over the hole 12, until the extended tip enters the wall hole, confirmed by tactile sensing. This extended nozzle tip also provides a cutoff surface when fitted into the beveled or chamfered portion of the hole, helping to prevent the adhesive (not shown in FIG. 5B) from entering the nozzle orifice or tub wall hole and fouling the installation. The extended nozzle tip, for an example of a 0.125 inch thick shell or tub wall, and a 0.125 inch diameter hole formed in the tub, may extend 0.030 inch into the chamfer portion 12A of the hole 12 to provide a pilot on the nozzle. The extended nozzle tip subtends an angle, which in an exemplary embodiment is 82 degrees, although other angles may be suitable for the purpose.

Figure 6A:
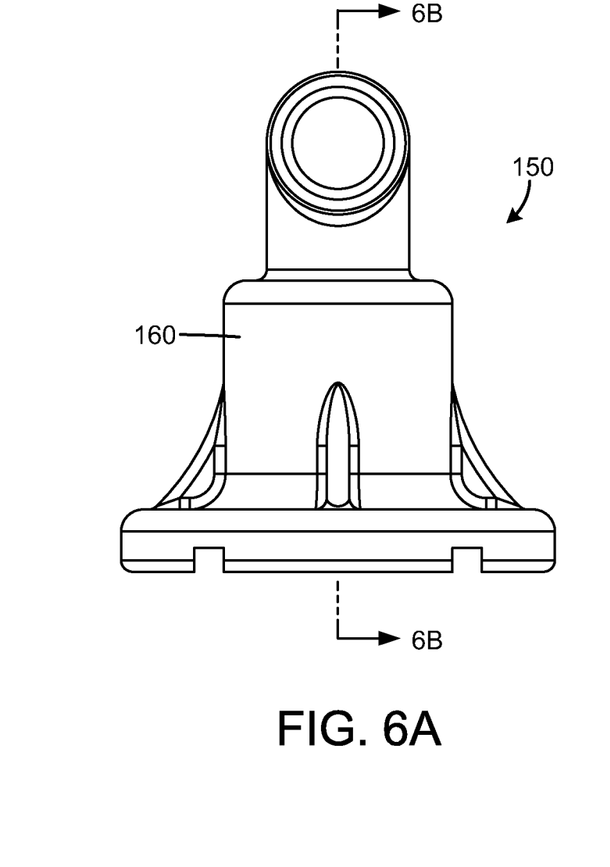
FIG. 6A is a front plan view of another alternate embodiment of an air fitting for a bathing installation.
Figure 6B:
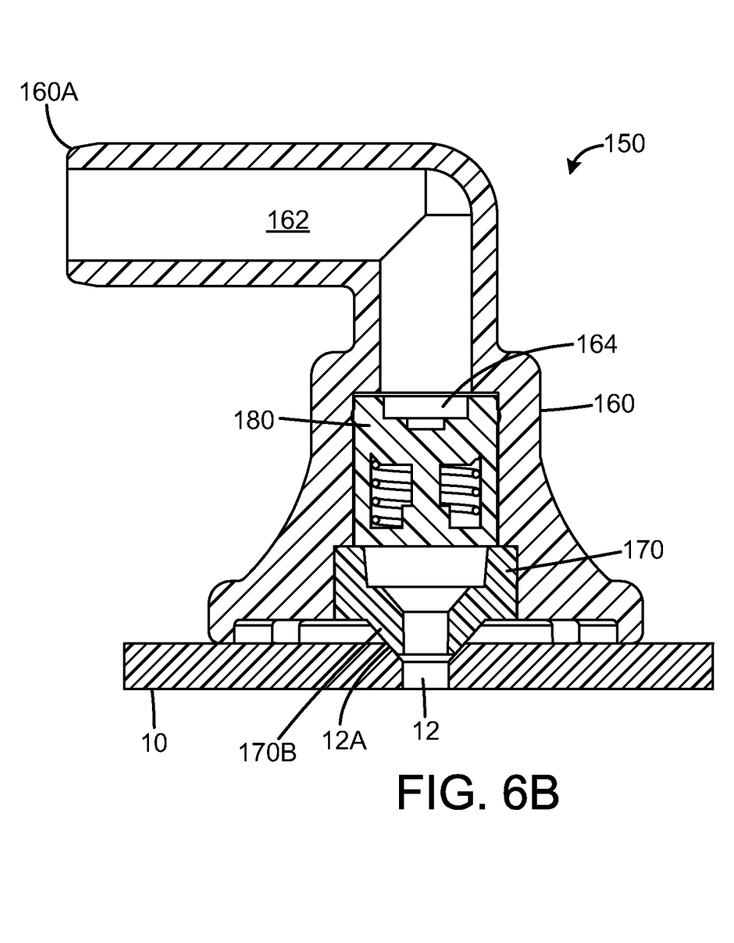
FIG. 6B is a cross-section view of the air fitting of FIG. 6A, positioned on a representation of a tub wall.
Figure 6C:
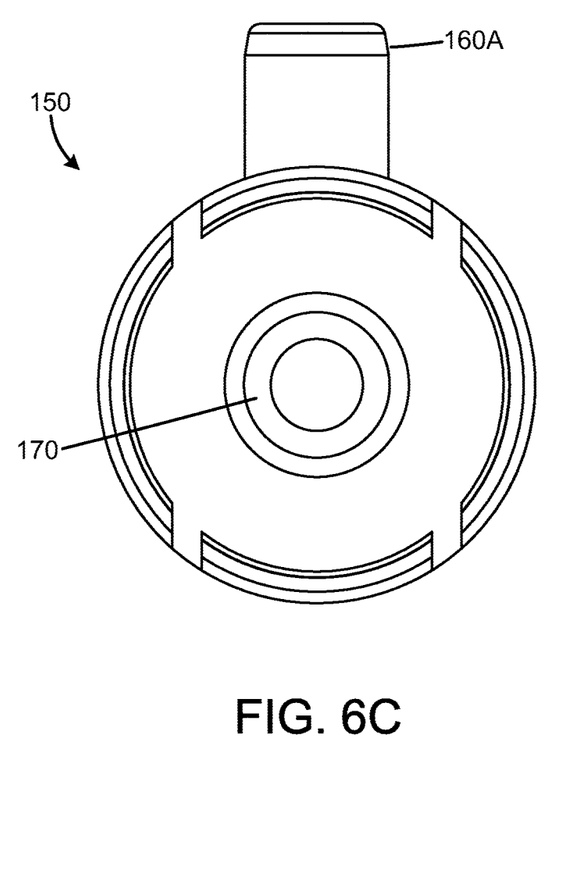
FIG. 6C is a bottom view of the air fitting embodiment of FIG. 6A.

FIGS. 6A-6C illustrate another embodiment of an air jet 150, in which the body provides an L-shaped hose connection. This jet is suited for use as the last jet in a string of jets, for example. The jet body 160 thus provides a single connection 160A, with air passageway 162 communicating between the connection 160A and the body opening 164. A check valve 180 is positioned in the opening 164, and may be the same as check valve 80 regarding the embodiment of FIGS. 1A-1C. The nozzle 170 may be the same as nozzle 120' of the embodiment of FIGS. 5A-5C, with the extended nozzle tip 170B. Alternatively, a nozzle with the nozzle tip configuration of nozzle 70 may alternatively be employed. FIG. 6B shows the air jet 150 installed on a wall 10 with orifice 12 having a beveled or chamfered portion 12A. The adhesive used to attach the air jet to the wall is not shown in FIG. 6B.

Figure 7:
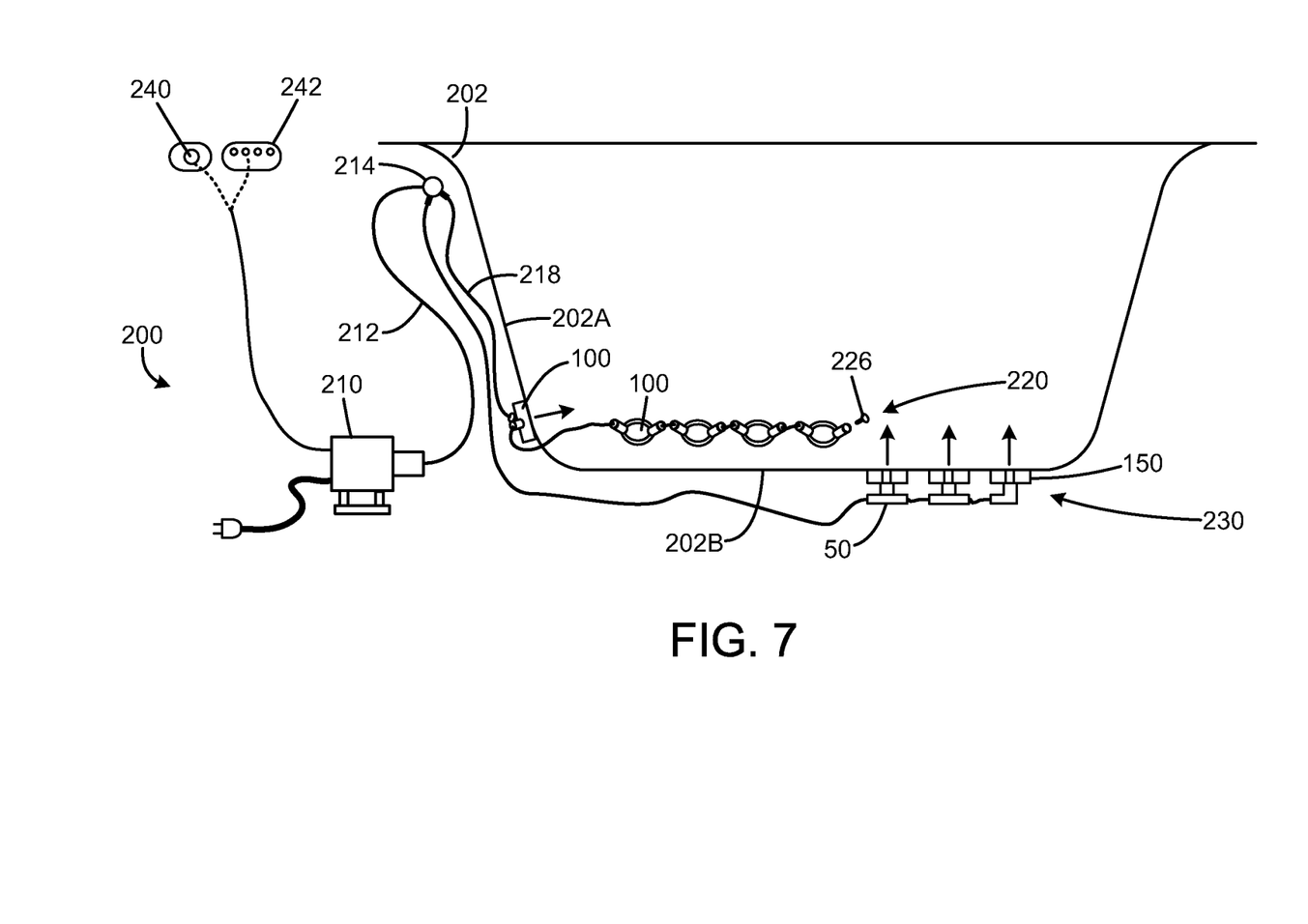
FIG. 7 is a schematic representation of a bathing installation tub with an air blower system and a set of air fittings connected to the blower system.

FIG. 7 schematically illustrates an exemplary embodiment of an air massage system 200, which includes a source 210 for positive air pressure that is sent through a plumbing system and hose to arrive at the air jet hose connection and passes thought the air jet exiting through the orifice and then through the hole in the tub shell into the bath. If an internal check valve is in the air jet, the air pressure must be sufficient open the check valve to have the air exit the orifice and through the wall in the side or bottom of the tub. In this embodiment, the plumbing system includes a flexible tube or hose 212 having one end connected to an outlet portion of the source 210, and a second end connected to a manifold 214. The manifold 214 distributes the pressurized air to multiple circuits of air jets, although for many installations, a single circuit of air jets may be employed, e.g. a lateral circuit of jets in the tub side wall, or a bottom circuit of jets in the bottom of the tub. The manifold may service multiple lateral circuits or multiple bottom circuits, depending on the air pressure and number of jets which can be serviced from a single pump or manifold output. In this exemplary embodiment, the first jet circuit 220 is a lateral circuit, and is connected to an outlet port on the manifold 214 by a hose or conduit tube 218, and the air jets include several (five are shown, but more or fewer jets could be employed) air jets with the compound angular configuration of jet 100. The last jet in the circuit 220 has its unused connection port plugged with plug 226. The jets in the circuit 220 are mounted to the side wall 202A of the bathing installation tub 202. The air jets in the string 220 may be the V-configuration jet of the configuration of jet 100, and may or may not include one-way flow valves, due to the V shape of the jet, facilitating self-draining when the tub is emptied of water.

The air jets of the second circuit 230 are mounted in the bottom wall 202B of the tub 202. The jets in this exemplary circuit may be of the straight T configuration of jet 50, with the terminal jet in the string an L-shaped jet having the configuration of jet 150. The jets in the tub bottom will typically include a one-way valve to prevent water from entering the air jet circuit air passageways.

The source 210 of system 200 may be controlled by an air switch 240, or by an electronic control panel 242, by way of example only.

Figure 8:
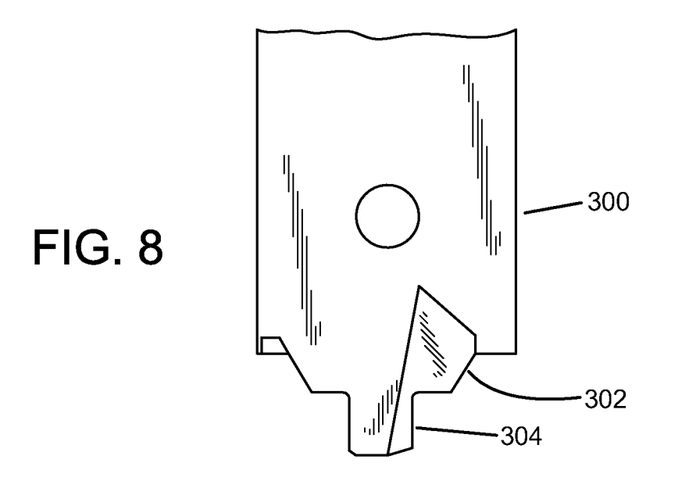
FIG. 8 illustrates an exemplary drill bit configured to form holes in a tub wall of a bathing installation for installation of an air fitting.
Figure 9:
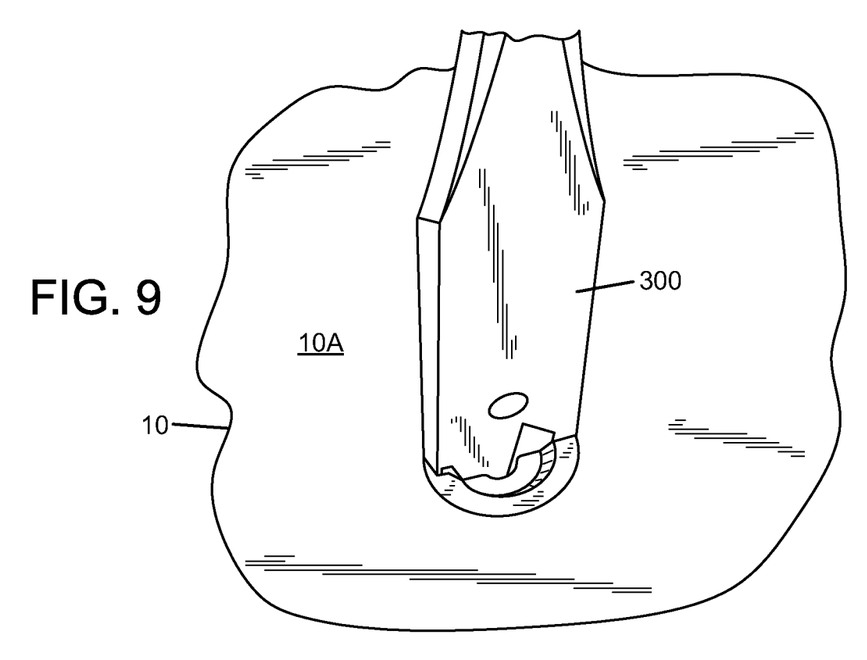
FIG. 9 illustrates the drill bit of FIG. 8 in operation to form an air fitting hole in a tub wall.

The beveled or chamfered hole 12 may be formed in the tub wall by a special drill bit such as bit 300 illustrated in FIGS. 8 and 9. The hole 12 may first be formed by use of a conventional drill bit of the size of the hole 12, e.g. 0.125 inch, drilling from the tub inside surface through the tub wall. Now working from the opposite, exterior side of the tub wall, the bit 300 may be used to form the chamfer 12A, with bit angled portion 302 forming the bevel to a predetermined depth. As an example, the tub wall 10 may have a thickness of 0.125 inch, and the chamfered edges of the nozzle tip may subtend an angle of 82 degrees. For the case in which the nozzle has an extended nozzle tip portion to extend past the bottom edge of the lip portion of the jet body, the nozzle tip may extend into the wall opening by 0.030 inch or so, to provide a pilot or alignment function, as described above. The drill bit 300 may be configured to provide a chamfer depth of 0.050 inch, for this example.

The air jet is well suited for use in bathing installations such as whirlpool baths or bath tubs, with air massage systems.

Although the foregoing has been a description and illustration of specific embodiments of the subject matter, various modifications and changes thereto can be made by persons skilled in the art without departing from the scope and spirit of the invention.

What is claimed is:

1. An air jet for a bathing vessel for holding bathing water, comprising:
    a body portion defining a hollow main body portion having an interior opening, and a connection portion having an air passageway in communication with the interior opening, the connection portion including at least one connection port for attachment to a hose carrying pressurized air, and a flange portion including a flange portion defining a recessed mount surface inside a peripheral lip surrounding a recess, the peripheral lip at a mounting surface side of the body portion and defining a lip edge configured to contact a wall of the vessel, with a plurality of open regions defined in the peripheral lip to allow excess adhesive applied to the mount surface within the recess to escape during installation of the air jet to the wall of the vessel;
    wherein the body portion is a unitary one-piece structure without requiring separate multi-piece portions assembled with annular seals or threads;
    a nozzle member constructed as a separate structure from the unitary one-piece structure of the body portion, the nozzle member configured to be fitted into the interior opening from the mounting surface side of the body portion and seated against a shoulder surface within the interior opening defined by the body portion, the nozzle member having a nozzle orifice and nozzle tip protruding into the recess, the nozzle orifice configured for concentric mounting relative to a single tub hole formed in the wall of the vessel to allow pressurized air to pass from the connection port through the central opening and directly through the nozzle orifice into the single tub hole and into the interior of the vessel, the nozzle tip configured to be in contact with the wall of the vessel surrounding the hole during the installation to prevent flow of adhesive into the hole during the installation, and wherein the nozzle member is fixed in position within the separate unitary structure of the body portion during use.

2. The air jet of claim 1, further comprising a one way flow valve disposed within the body portion in the interior opening between the air passageway and the nozzle member to allow air flow from the air passageway into the nozzle member and prevent air and water flow from the nozzle member to the air passageway.

3. The air jet of claim 2, wherein the one way flow valve is a check valve, the check valve having a normally closed position to block passage of water or air from flowing through the interior opening, and having an open position caused by application of pressurized air to the air passageway to allow the air to exit the nozzle orifice and pass through the tub hole.

4. The air jet of claim 1, wherein the connection portion extends from the main body portion by an angular offset from a perpendicular to a center axis of the main body portion, so that the connection port is placed away the tub wall after installation onto the wall of the tub, thereby facilitating installation of the hose onto the connection port after installation of the body portion on the tub wall.

5. The air jet of claim 1, wherein the connection portion includes a first connection portion with a first connection port and a second connection portion with a second connection port in a general T-shaped configuration, and wherein the first and second connection portions define compound angles relative to a center axis of the main body portion and define a "V" shaped configuration relative to each other, and wherein the compound angle provides a self-draining effect when the air jet is mounted to the side of the vessel with the first and second connection portions disposed upward directions.

6. The air jet of claim 1, wherein the nozzle member comprises a protruding tapered nozzle tip with a nozzle face surface extends below the edge of the lip portion to serve as a pilot to enter into and align to the tub wall hole during installation of the air jet.

7. The air jet of claim 1, wherein the nozzle member comprises a protruding nozzle tip having a through opening of uniform diameter passing through a nozzle body, the exterior surface of the nozzle body forming a taper to the nozzle face surface, with a nozzle face surface which is positioned at a plane defined by the peripheral lip of the flange portion of the body portion, the nozzle face surface positioned to abut a wall surface of the vessel surrounding a hole formed in the wall of the vessel and prevent adhesive from flowing from the recess into the hole or nozzle orifice.

8. The air jet of claim 1, wherein the flange portion has a diameter of less than about 1.25 inch, and the main body portion has a length of less than about 1.25 inch.

9. An air massage system comprising:
at least one air jet as defined in claim 1;
a source for positive air pressure;
a plumbing system connected to the source and including a hose connected to the at least one air jet, to supply positive air pressure to the air jet to pass thought the air jet exiting through the orifice and then through the hole in the vessel into the bathing water.

10. An air jet for a bathing vessel for holding bathing water, comprising:
a body portion defining a hollow main body portion having an interior opening, and a connection portion having an air passageway in communication with the interior opening, the connection portion including at least one connection port for attachment to a hose carrying pressurized air, and a flange portion including a flange portion defining a recessed mount surface inside a peripheral lip surrounding a recess, the peripheral lip at a mounting surface side of the body portion and defining a lip edge configured to contact a wall of the vessel, with a plurality of open regions defined in the peripheral lip to allow excess adhesive applied to the mount surface within the recess to escape during installation of the air jet to the wall of the vessel;
wherein the body portion is a unitary one-piece structure without requiring separate multi-piece portions assembled with annular seals or threads, and the hollow main body portion and the first and second connection portions define a T-shaped air jet configuration;
a nozzle member constructed as a separate structure from the unitary one-piece structure of the body portion, the nozzle member configured to be fitted into the interior opening from the mounting surface side of the body portion and seated against a shoulder surface within the interior opening defined by the body portion, the nozzle member having a nozzle orifice and nozzle tip protruding into the recess, the nozzle orifice configured for concentric mounting relative to a single tub hole formed in the wall of the vessel to allow pressurized air to pass from the connection port through the central opening and directly through the nozzle orifice into the single tub hole and into the interior of the vessel, the nozzle tip configured to be in contact with the wall of the vessel surrounding the hole during the installation to prevent flow of adhesive into the hole during the installation, and wherein the nozzle member is fixed in position within the separate unitary structure of the body portion during use;
wherein the first and second connection portions define compound angles relative to a center axis of the main body portion and define a "V" shaped configuration relative to each other, and wherein the compound angle provides a self-draining effect when the air jet is mounted to the side of the vessel with the first and second connection portions disposed upward directions; and
wherein no air jet attachment features are visible from the interior of the vessel.

11. The air jet of claim 10, wherein the nozzle member comprises a protruding tapered nozzle tip with a nozzle face surface extends below the edge of the lip portion to serve as a pilot to enter into and align to the tub wall hole during installation of the air jet.

12. The air jet of claim 10, wherein the nozzle member comprises a protruding nozzle tip having a through opening of uniform diameter passing through a nozzle body, the exterior surface of the nozzle body forming a taper to the nozzle face surface, with a nozzle face surface which is positioned at a plane defined by the peripheral lip of the flange portion of the body portion, the nozzle face surface positioned to abut a wall surface of the vessel surrounding a hole formed in the wall of the vessel and prevent adhesive from flowing from the recess into the hole or nozzle orifice.

13. The air jet of claim 10, wherein the flange portion has a diameter of less than about 1.25 inch, and the main body portion has a length of less than about 1.25 inch.

14. The air jet of claim 2, wherein the valve is maintained in position within the interior opening after the installation by the nozzle member and the tub wall.

15. The air jet of claim 1, wherein the interior opening is generally cylindrical, with a stepped change in diameter from a first diameter portion to a second diameter portion, the second diameter smaller than the first diameter to define the shoulder surface, the nozzle fitted into the interior opening having the second diameter.

16. The air jet of claim 1, further comprising an adhesive applied in the recess between the nozzle and the perimeter lip of the flange portion and surrounding the nozzle tip to secure the air jet to the tub wall, with any excess adhesive escaping through the open regions in the peripheral lip.

17. The air jet of claim 1, wherein the unitary one-piece structure is an injection-molded part fabricated from a plastic material.

\* \* \* \* \*